(12) United States Patent
Shi et al.

(10) Patent No.: US 9,357,761 B2
(45) Date of Patent: Jun. 7, 2016

(54) VISCOUS FISH EGG KILLING DEVICE

(71) Applicant: CHINA THREE GORGES UNIVERSITY, Yichang, Hubei (CN)

(72) Inventors: Xiaotao Shi, Hubei (CN); Defu Liu, Hubei (CN); Qiuwen Chen, Hubei (CN); Yingping Huang, Hubei (CN); Yong Gao, Hubei (CN)

(73) Assignee: CHINA THREE GORGES UNIVERSITY (CN)

( * ) Notice: Subject to any disclaimer, the term of this patent is extended or adjusted under 35 U.S.C. 154(b) by 7 days.

(21) Appl. No.: 14/123,111

(22) PCT Filed: Mar. 8, 2013

(86) PCT No.: PCT/CN2013/072339
§ 371 (c)(1),
(2) Date: Nov. 29, 2013

(87) PCT Pub. No.: WO2013/159603
PCT Pub. Date: Oct. 31, 2013

(65) Prior Publication Data
US 2015/0201606 A1    Jul. 23, 2015

(30) Foreign Application Priority Data

Apr. 27, 2012    (CN) .......................... 2012 1 0126745

(51) Int. Cl.
*A01K 79/02*    (2006.01)
*A01M 19/00*    (2006.01)
(Continued)

(52) U.S. Cl.
CPC ................ *A01M 19/00* (2013.01); *A01K 61/00* (2013.01); *A01K 79/02* (2013.01); *A01M 23/38* (2013.01)

(58) Field of Classification Search
CPC ...... A01K 79/02; A01K 61/00; A01K 61/008
USPC .............. 43/17.1, 98, 9.6; 119/219, 220, 205, 119/217
See application file for complete search history.

(56) References Cited

U.S. PATENT DOCUMENTS 794,573 A * 7/1905 Ward .................... A01M 23/38
                                                                    43/98
978,872 A * 12/1910 Freer ...................... A01K 79/02
                                                                    43/17.1

(Continued)

FOREIGN PATENT DOCUMENTS

| NL | EP 2243357 A1 * | 10/2010 | ............. A01K 79/02 |
| NO | WO 9300003 A1 * | 1/1993 | ............. A01K 79/02 |
| PL | WO 2010138009 A2 * | 12/2010 | ............. A01K 79/02 |

*Primary Examiner* — Darren W Ark
(74) *Attorney, Agent, or Firm* — Wiersch IP Law

(57) ABSTRACT

A viscous fish egg killing device is provided. Every two conductive fish nests (1) are distributed side by side at a certain distance. One conductive fish nest (1) of every two conductive fish nests (1) is connected to a positive pole (3) of a power source, and the other conductive fish nest (1) is connected to a negative pole (5) of the power source. Each conductive fish nest (1) is connected in series or in parallel to the power source through a conducting wire (2). The fish nest attracts fish to lay eggs. After the device is electrified, an electric field is formed between two conductive fish nests, so as to kill fertilized eggs in the fish nest, and a method for eliminating invading fish is provided from the perspective of eliminating fertilized eggs of the fish in reverse thinking, and the device has a simple structure, is easy to be operated, and is efficient.

5 Claims, 2 Drawing Sheets

(51) Int. Cl.
*A01K 61/00* (2006.01)
*A01M 23/38* (2006.01)

(56) References Cited

U.S. PATENT DOCUMENTS

| | | | | | |
|---|---|---|---|---|---|
| 1,269,380 | A | * | 6/1918 | Burkey | A01K 79/02 43/98 |
| 1,292,246 | A | * | 1/1919 | Burkey | A01K 79/02 43/98 |
| 1,515,547 | A | * | 11/1924 | Burkey | A01K 79/02 43/17.1 |
| 1,690,440 | A | * | 11/1928 | Baker | A01K 79/02 43/17.1 |
| 1,974,444 | A | * | 9/1934 | Burkey | A01K 63/00 43/17.1 |
| 2,146,105 | A | * | 2/1939 | Baker | A01K 79/02 119/220 |
| 2,233,045 | A | * | 2/1941 | Miller | E02B 1/006 43/17.1 |
| 2,612,861 | A | * | 10/1952 | Burkey | A01K 79/02 43/17.1 |
| 2,709,984 | A | * | 6/1955 | Marks | A01K 79/02 43/17.1 |
| 2,778,140 | A | * | 1/1957 | Applegate | A01K 79/02 43/17.1 |
| 2,808,674 | A | * | 10/1957 | Vang | A01K 79/00 43/17.1 |
| 2,850,833 | A | * | 9/1958 | Kreutzer | A01K 79/02 43/17.1 |
| 2,903,813 | A | * | 9/1959 | Gudjohnsen | A01K 79/02 43/17.1 |
| 2,913,846 | A | * | 11/1959 | McLain | A01K 69/06 43/17.1 |
| 2,991,421 | A | * | 7/1961 | Volz | A01K 79/02 43/17.1 |
| 3,005,280 | A | * | 10/1961 | Vang | A01K 79/02 43/17.1 |
| 3,110,978 | A | * | 11/1963 | Kreutzer | A01K 79/02 43/4.5 |
| 3,118,424 | A | * | 1/1964 | Willinger | A01K 61/006 119/217 |
| 3,369,318 | A | * | 2/1968 | Kreutzer | A01K 79/02 43/17.1 |
| 3,415,001 | A | * | 12/1968 | Ott | A01K 79/02 43/17.1 |
| 3,483,649 | A | * | 12/1969 | Hightower | A01K 79/02 43/17.1 |
| 3,491,474 | A | * | 1/1970 | Metcalf, Jr. | A01K 73/02 43/17.1 |
| 3,565,042 | A | * | 2/1971 | Allan | A01K 61/008 119/217 |
| 3,693,276 | A | * | 9/1972 | Kurc | A01K 79/02 43/17.1 |
| 3,714,729 | A | * | 2/1973 | Moise | A01K 79/02 43/17.1 |
| 3,775,891 | A | * | 12/1973 | Holt | A01K 79/02 43/17.1 |
| 3,802,109 | A | * | 4/1974 | Stein | A01K 79/02 43/17.1 |
| 4,211,980 | A | * | 7/1980 | Stowell | H04B 13/02 119/220 |
| 4,417,301 | A | * | 11/1983 | Newman | A01K 79/02 43/17.1 |
| 4,441,453 | A | * | 4/1984 | McMickle | A01K 61/006 119/221 |
| 4,471,552 | A | * | 9/1984 | McIntosh | A01K 79/02 43/17.1 |
| 4,509,285 | A | * | 4/1985 | Smith | A01K 73/00 43/17.1 |
| 4,869,016 | A | * | 9/1989 | Diprose | B63B 59/04 43/17.1 |
| 5,445,111 | A | * | 8/1995 | Smith | H04B 13/02 119/220 |
| 5,448,968 | A | * | 9/1995 | Ostlie | A01K 79/02 119/220 |
| 5,551,377 | A | * | 9/1996 | Sharber | A01K 79/02 119/220 |
| 5,644,863 | A | * | 7/1997 | Verburg | A01K 79/02 43/17.1 |
| 5,653,052 | A | * | 8/1997 | Østlie | A07K 79/02 431/17.1 |
| 5,797,210 | A | * | 8/1998 | Verburg | A01K 79/02 43/9.6 |
| 6,357,390 | B1 | * | 3/2002 | Maehata | H05C 1/04 119/220 |
| 6,917,294 | B2 | * | 7/2005 | Larsen | A01K 75/00 119/220 |
| 6,978,734 | B1 | * | 12/2005 | Smith | A01K 79/02 119/220 |
| 7,975,425 | B1 | * | 7/2011 | VanBurch | A01K 79/02 43/17.1 |
| 8,020,515 | B2 | * | 9/2011 | Metzler | A01K 61/006 119/221 |
| 2011/0277693 | A1 | * | 11/2011 | Parkin | A01K 79/02 43/17.1 |

* cited by examiner

VISCOUS FISH EGG KILLING DEVICE

FIELD

The present invention belongs to the field of biotechnology, in particular relates to a viscous fish egg killing device.

BACKGROUND

Nowadays, national and regional exchanges have become increasingly frequent, invasive species cause a certain pressure on indigenous species, brining about a certain negative impact on ecology in some areas. Some fishes in a certain area are classified as the invasive species that shall be seemed to be cleared. The most typical example occurred in the United States and Europe, such as cyprinids such as carp has led to a larger ecological problem, resulting in declining some species population, and even endangering some rare species. Carp has been defined as the invasive species by legislation in many states of the United States, so as to allow clearing its existing individual through a variety of methods as well as avoiding the spread between the waters. It is more difficult to completely remove the existing individual of the invasive fish that mainly because there is extensive area of water areas, such as natural rivers and lakes, more shelters, individual fish moves more agile, fish swims among different areas and it is difficult to control for human beings, etc. The United States has found some ways of clearing invasive fish, such as artificial fishing, electric shock, calling for fishing, increase in invasive fish consumption, and setting of gate dams and obstacles, etc. among different water areas. However, various methods have certain limitations, such as high labor intensity and low efficiency, etc. Various methods conducing to clearing the invasive fish remain further study.

Currently, more commonly used method for clearing the invasive fish focuses on adult fish and juvenile fish. Reports from the perspective of clearing the invasive fish in terms of the fertilized eggs are still less. Some fish species such as carp have a characteristic that its eggs are of various eggs and have stronger viscosity. Although the carp can still spawn naturally in running water or still water, attachments shall be required finding so that the fertilized eggs can be adhere thereto. By the use of the characteristics that a variety of fish including carp spawns viscous eggs and needs the attachments, it is discovered that the attachments can be artificially set for eggs and the spawning rate of these fish can be raised. These artificial set attachments for eggs are called as the fish nests. The materials for preparing the fish nest just only is non-toxic, soft and slender, has more beards and is easily dispersed in water but is difficulty corrosive. Common fish nest includes fish nests made of willow roots, water hyacinth, and silk screen, etc. The root part of the fish nest is suspended in water so as to attract carps to spawn in the fish nest during the breeding season. Fish nest is a method that is discovered by people taking advantage of spawning characteristics of the fish to improve the breeding success rate of the fish. It is worth of thinking deeply in reverse thinking, i.e., clearing the invasive fish eggs by the use of the viscous eggs spawned by the fish.

Electric shock is commonly used method for catching or controlling the adult fish or juvenile fish. The commonly used method is electric fishing, in addition to low voltage anesthesia fish, etc. Fertilized eggs are at one of the most vulnerable periods of their life cycle, so that the low voltage electricity relatively safe to the human beings can kill the fertilized eggs. A method for killing and wounding the fertilized eggs of the invasive fishes can be produced by the characteristics that the fertilized eggs adhere to the attachments and can be killed by the low voltage electricity. Thus it is necessary to invent a device for killing and wounding the viscous eggs.

SUMMARY

The technical problems to be solved in the present invention is to provide a viscous fish egg killing device, which can attract fish to lay eggs and kill fertilized eggs. The device has a simple structure, is easy to be operated and is efficient.

To achieve the above object, the present invention has the technical scheme is as follows: a viscous fish egg killing device is characterized that every two conductive fish nests are distributed side by side at a certain distance. One conductive fish nest of every two conductive fish nests is connected to a positive pole of a power source, and the other conductive fish nest is connected to a negative pole of the power source. Each conductive fish nest is connected in series or in parallel to the power source through a conducting wire.

The conductive fish nest consists of a fish nest and a conductive device in the fish nest. The conductive device is connected in series or in parallel to the power source through the conductive wire.

The conductive device is a fine wire or a metal mesh.

The conductive fish nest is a fish nest made of roots of willow or a fish nest made of plastic rope beards with a fixed end.

A spacing distance between the adjacent conductive fish nests is 0.1-0.5 m.

Each conductive fish nest is fixed on a float rod.

The power source is of a DC power source with adjustable voltage and current, and the power voltage is 5-36 v.

The viscous fish egg killing device as provided in the present invention has the beneficial effects as follows:

As every two conductive fish nests of a plurality of conductive fish nests are respectively connected with the positive pole and the negative pole of the power source, the fish nest attracts fish to lay eggs. After the device is electrified, an electric field is formed between two conductive fish nests, so as to kill fertilized eggs in the fish nest, and a method for eliminating invading fish is provided from the perspective of eliminating fertilized eggs of the fish in reverse thinking, and the device has a simple structure, is easy to be operated, and is efficient.

The float rod may be designed to suspend each conductive fish nest in water as well as fix the respective relative distance of each conductive fish nest in water to prevent being close to each other.

The 5-36 v low voltage power source can be selected to kill the fertilized eggs in the fish nest but not damage to human body, so that the device is safe and efficient.

BRIEF DESCRIPTION OF THE DRAWINGS

The present invention is further descried hereunder by reference to drawings and embodiments.

DETAILED DESCRIPTION

Figure 1:
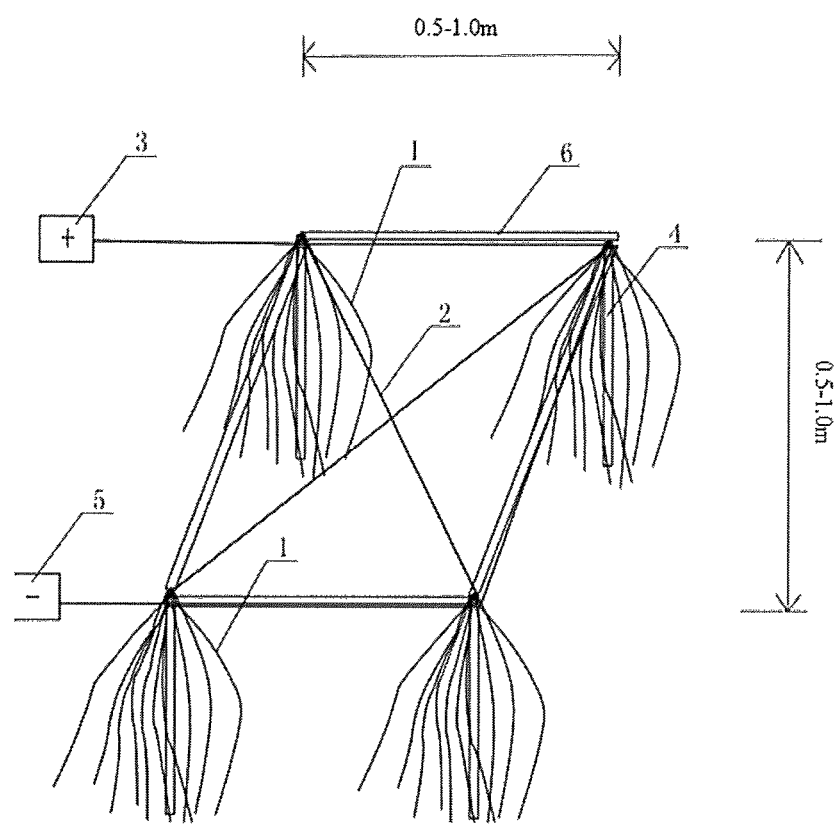
FIG. 1 is a schematic structural diagram of the present invention.

As shown in FIG. 1, a viscous fish egg killing device consists of a plurality of conductive fish nests 1, a conducting wire 2 and a power source, wherein every two conductive fish nests 1 are distributed side by side at a certain distance. One conductive fish nest 1 of every two conductive fish nests 1 is connected to a positive pole 3 of a power source, and the other conductive fish nest 1 is connected to a negative pole 5 of the power source. Each conductive fish nest 1 is connected in series or in parallel to the power source through a conducting wire 2.

The conductive fish nest 1 consists of a fish nest and a conductive device 4 in the fish nest. The conductive device 4 is connected in series or in parallel to the power source through the conductive wire 2.

The conductive fish nest is of a fish nest made of plastic rope beards with a fixed end. The plastic rope beards are 0.8 m long and 0.01 m thick. Each bundle of plastic rope includes 200 beards. One end is bonded together and the other is dispersed free. The overall become fluffy like water plants in the water body.

A spacing distance between the adjacent conductive fish nests 1 is 0.1-0.5 m.

Figure 2:
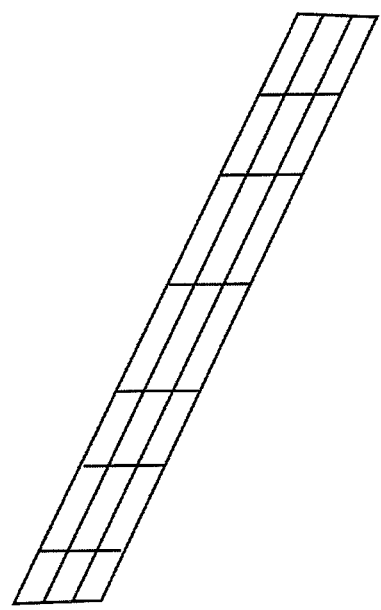
FIG. 2 is a schematic diagram that the conductive device is of a metal mesh in the present invention.

The conductive device 4 is of a metal mesh in a structure as shown in FIG. 2. The metal mesh is fixed at the bonding end of the fish nest. The bonding end of the fish mesh is the floating rod 6 so as to facilitate the dispersing end of the fish nest suspending in water. A hard matter is selected as the float rod 6, such as bamboo pole, which can further fix the respective relative distance of each conductive fish nest 1 in water to prevent from being close to each other.

The power source is of a DC power source with adjustable voltage and current, and the power voltage is 5-36 v.

Turn on the power source, adjust the voltage to 24 v and electrify for 5 s. An electric field is formed between two conductive fish nests 1 connected to the positive pole and the negative pole of the power source so as to kill the fertilized eggs in the electric field immediately.

The power source can also be turned on according to the actual situation to adjust to the voltage as required, i.e., achieving electric shock in batch of the fish eggs produced in batch, and finally achieving the purpose of clearing the fish eggs of the conductive fish nest 1.

The spacing distance between the two conductive fish nests 1 connecting to the positive pole and the negative pole of the power source shall not be too far so as to form an electric field after electrifying. The spacing distance is generally 0.1-0.5 m.

The conductive device 4 can also use the fine metal wire instead of the metal mesh. The conductive fish nest can use the fish nest made of root of the willow instead of the fish nest made of plastic rope beards.

INDUSTRIAL APPLICABILITY

For the viscous fish egg killing device as provided by the invention, as every two conductive fish nests of a plurality of conductive fish nests are respectively connected with the positive pole and the negative pole of the power source, the fish nest attracts fish to lay eggs. After the device is electrified, an electric field is formed between two conductive fish nests, so as to kill fertilized eggs in the fish nest, and a method for eliminating invading fish is provided from the perspective of eliminating fertilized eggs of the fish in reverse thinking, and the device has a simple structure, is easy to be operated, and is efficient.

The float rod may be designed to suspend each conductive fish nest in water as well as fix the respective relative distance of each conductive fish nest in water to prevent being close to each other.

The 5-36 v low voltage power source can be selected to kill the fertilized eggs in the fish nest but not damage to human body, so that the device is safe and efficient.

What is claimed is:

1. A viscous fish egg killing device, characterized in that every two conductive fish nests (1) are distributed side by side at a certain distance, one conductive fish nest (1) of the every two conductive fish nests (1) is connected to a positive pole (3) of a power source, the other conductive fish nest (1) of the every two conductive fish nests (1) is connected to a negative pole (5) of the power source, and each of the conductive fish nests (1) is connected in series or in parallel to the power source through a conducting wire (2), the conductive fish nests (1) each consists of a fish nest and a conductive device (4) in the fish nest, and the conductive device (4) is connected in series or in parallel to the power source through the conducting wire (2), the fish nest is made of roots of willow or multiple plastic rope beards with a fixed end, first ends of the roots of willow or the plastic rope beards being bonded together at the fixed end, and second ends of the roots of willow or the plastic rope beards opposite to the first ends of the roots of willow or the plastic rope beards being dispersed free.

2. The viscous fish egg killing device according to claim 1, wherein the conductive device (4) is of a fine metal wire or a metal mesh.

3. The viscous fish egg killing device according to claim 1, wherein the certain distance between the every two conductive fish nests (1) is 0.1-0.5 m.

4. The viscous fish egg killing device according to claim 1, wherein the bonded together end of each conductive fish nest (1) is fixed on a float rod (6) and the other end is dispersed free in the water.

5. The viscous fish egg killing device according to claim wherein the power source is a DC power source with adjustable voltage and current, and the power voltage is 5-36 v.

* * * * *